F. HERBERT.
MACHINE FOR MAKING CORES.
APPLICATION FILED DEC. 7, 1908.

997,293.

Patented July 11, 1911.
5 SHEETS—SHEET 1.

WITNESSES

Fred Herbert
INVENTOR
BY his ATTORNEY
Samuel E. Darby

F. HERBERT.
MACHINE FOR MAKING CORES.
APPLICATION FILED DEC. 7, 1908.

997,293.

Patented July 11, 1911.

5 SHEETS—SHEET 4.

WITNESSES

Fred Herbert
INVENTOR
BY HIS ATTORNEY

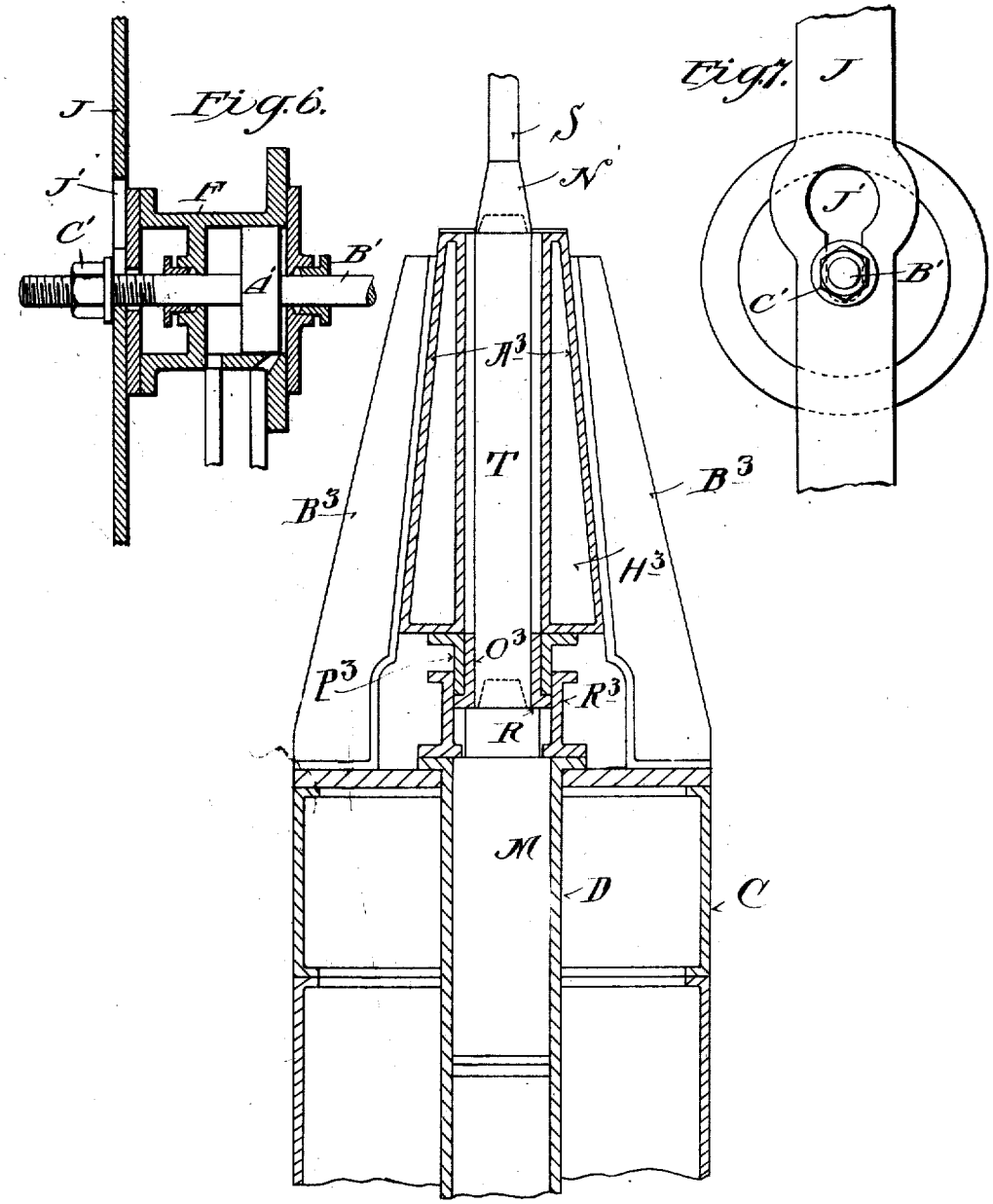

UNITED STATES PATENT OFFICE.

FRED HERBERT, OF BIRTLEY, ENGLAND.

MACHINE FOR MAKING CORES.

997,293.

Specification of Letters Patent.    Patented July 11, 1911.

Application filed December 7, 1908.  Serial No. 466,202.

*To all whom it may concern:*

Be it known that I, FRED HERBERT, a subject of the King of Great Britain, residing at Birtley, county of Durham, England, have made a certain new and useful Invention in Machines for Making Cores, of which the following is a specification.

This invention relates to machines for making cores.

The object of the invention is to provide a machine which is strong and durable, simple in construction, and efficient in operation for making cores employed in molding pipes or other castings.

A further object of the invention is to provide a machine for making cores rapidly and economically.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Figure 1:
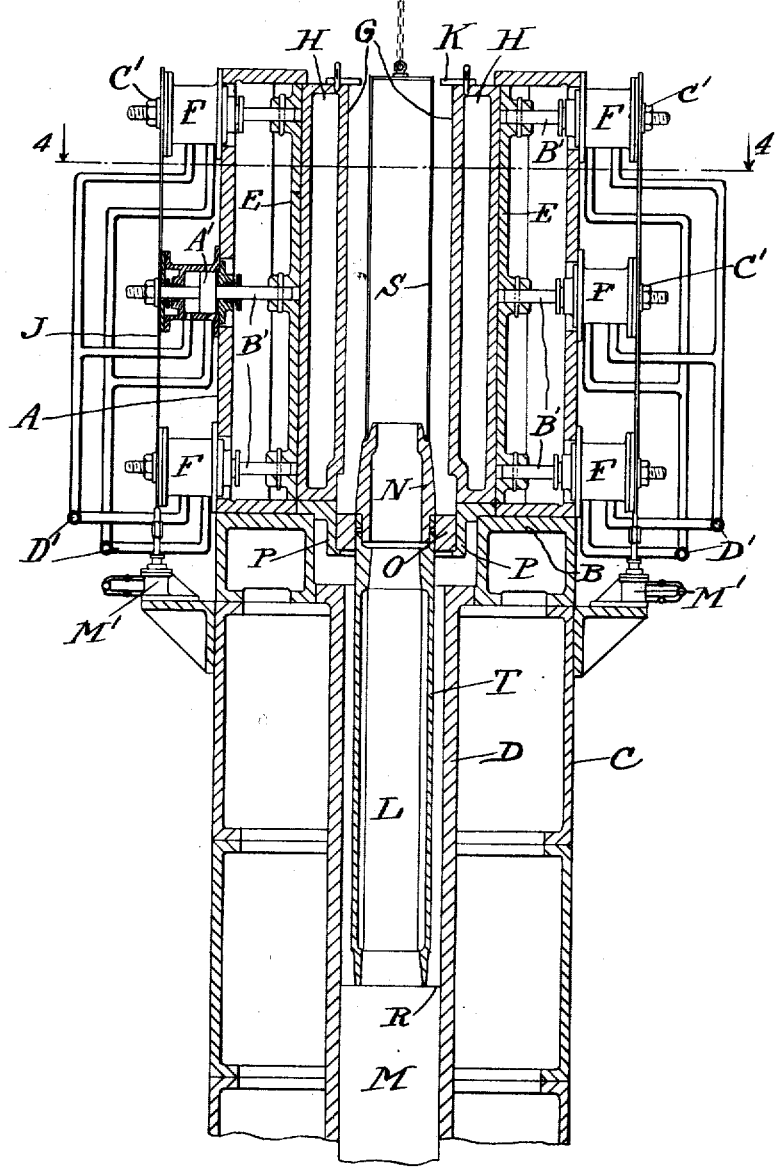
Figure 2:
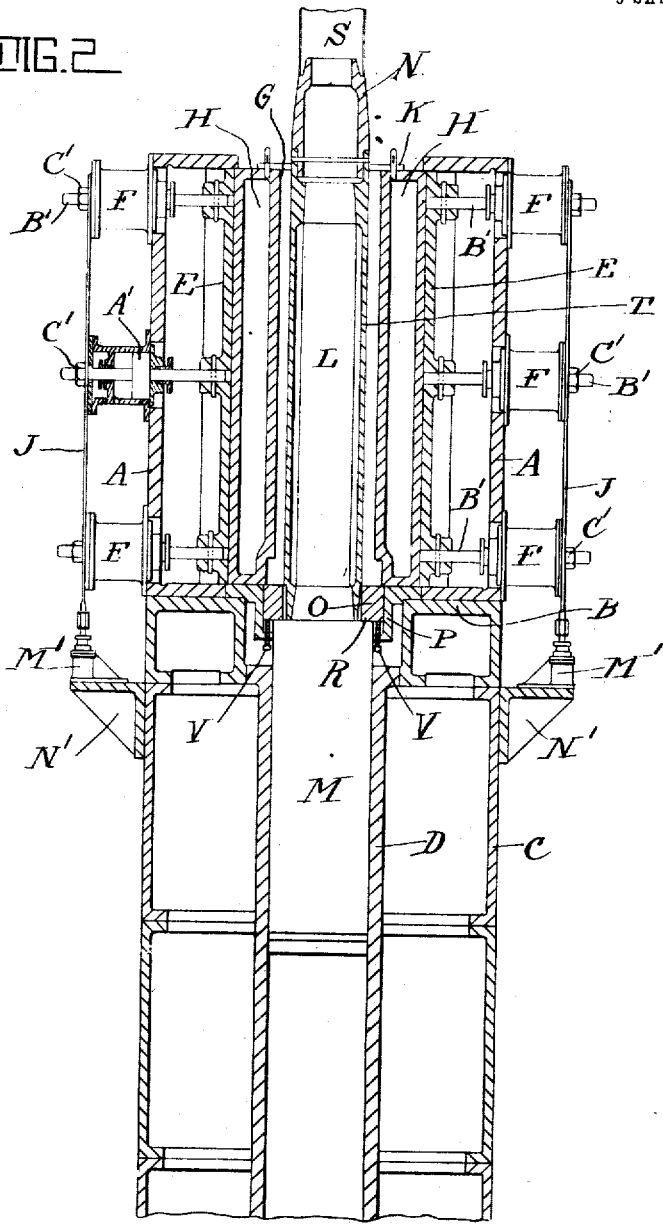
Figure 3:
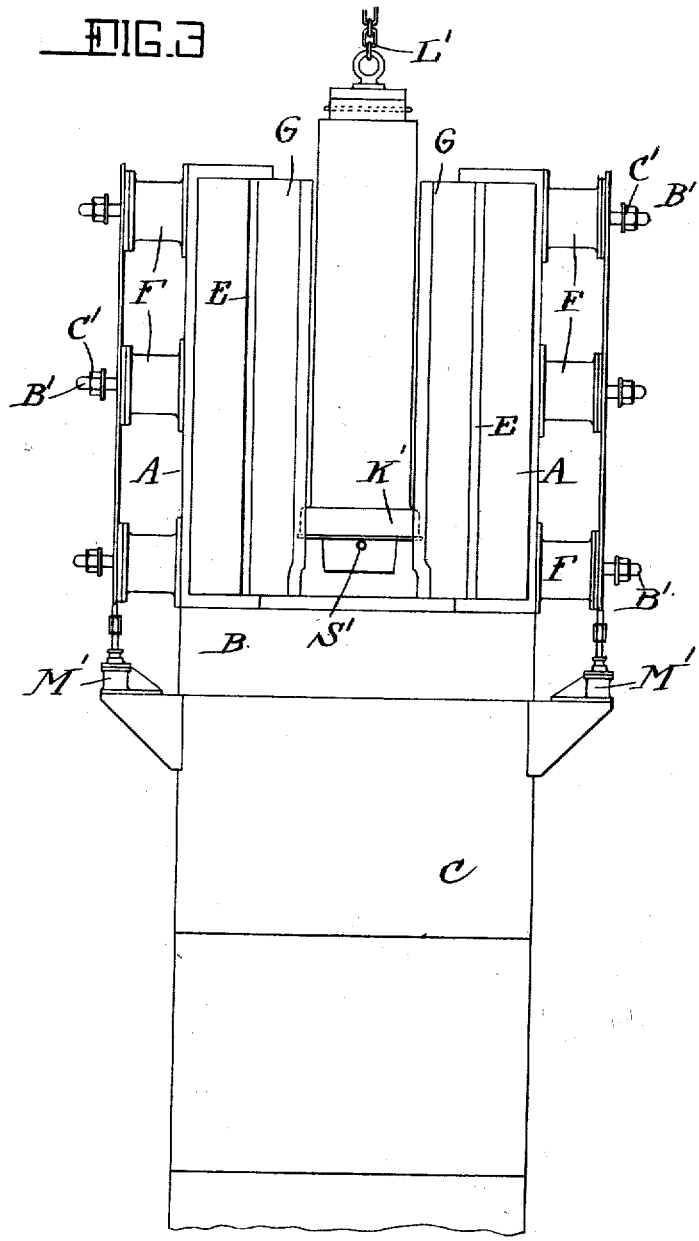
Figure 4:
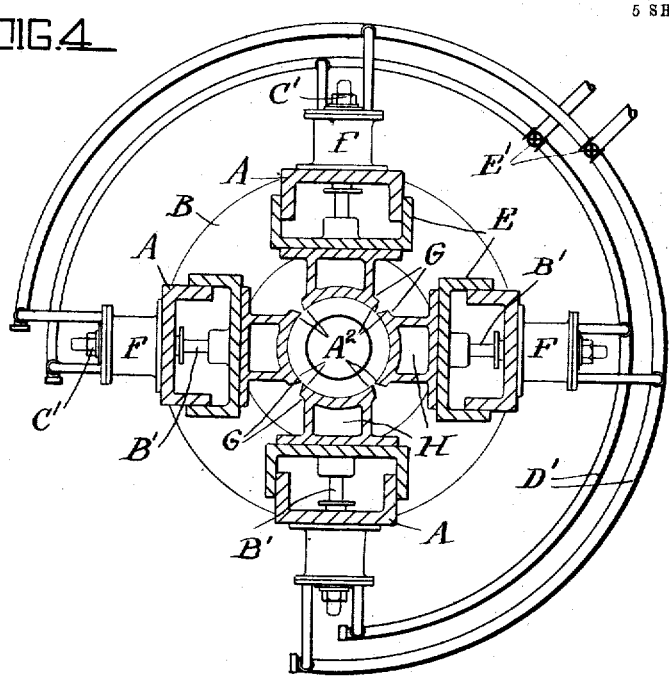
Figure 5:
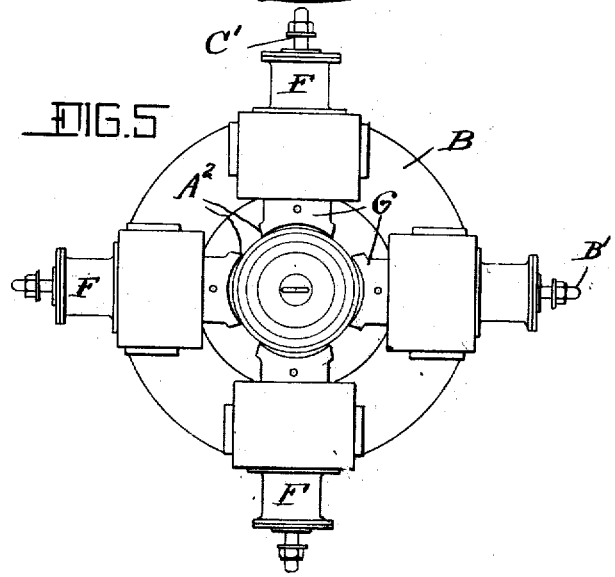

Referring to the accompanying drawings, and to the various views and reference signs appearing thereon,—Figure 1 is a view in vertical central section of a core making machine embodying the principles of my invention, the lower part of the machine being broken off, the core box being partially closed, the measuring tool inserted therein, the plunger in its lower position, and the core bar in position to be advanced through the core box. Fig. 2 is a similar view showing the core bar in its raised position at the completion of the core forming operation, the core box being completely closed. Fig. 3 is a view in side elevation showing the core box opened and the finished core being raised out of the same. Fig. 4 is a view in transverse section on the line 4, 4, Fig. 1, looking in the direction of the arrows. Fig. 5 is a top plan view of the core box showing the same opened. Fig. 6 is a broken detail view in central section of a core box section operating cylinder, showing the plate employed to limit the extent of closing movement of the core box. Fig. 7 is a similar view in elevation of the same. Fig. 8 shows in vertical central longitudinal section, parts broken off, a somewhat different construction of machine embraced within the scope of my invention, and which, by reason of its extreme simplicity of structure and capability of adjustment, I prefer in many cases.

The same part is designated by the same reference sign wherever it occurs throughout the several views.

The operation of making cores for use in casting pipes, as ordinarily carried out in practice, is slow and tedious and generally involves the expense and annoyance of manual labor.

It is among the special purposes of my invention to provide a machine which is simple in construction and efficient in operation wherein cores may be made rapidly and economically, and by machine operation instead of manual labor, and wherein absolute uniformity is secured throughout the core thereby avoiding damage or injury to the casting resulting from any deficiency in this respect in the core.

In carrying out my invention, and in a broad statement of its general scope and purport, I employ a core box in which the core is formed, such core box being contractible whereby, in forming the core, and to insure absolute uniformity in the density thereof throughout the same I propose to apply a compression exteriorly as well as interiorly to the core material. When the core is completed, the core box is opened up to permit of the ready removal of the completed and finished core. I also propose to regulate and control the quantity of core material required to form the core, the various operations being carried out mechanically and substantially continuously, thereby enabling machine made cores to be turned out rapidly and economically.

While I have shown and will now describe various constructions and arrangements of apparatus embodying the principles of my invention, and the best forms in which I at present contemplate carrying my invention into practical and commercial operation, the particular constructions and arrangements shown are merely illustrative of the principles involved and may be varied and changed throughout a wide range without departure from the broad spirit and scope of my invention as defined in the claims.

In the form shown in Figs. 1 to 7, I mount stationary pillars A, upon a suitable support or bed plate B. These pillars A, are preferably of channel form in cross section, as seen in Fig. 4, with the open sides of the channels presented toward a common center, said pillars being spaced around such center in symmetrical arrangement with respect thereto. While I have shown four such pillars, I do not desire to be limited or restricted in this respect as the numbers thereof may be varied according to the numbers of sections of the core box desired. Upon each fixed or stationary pillar A, is mounted a movable pillar E. These movable pillars E, may be of any suitable or convenient form. I have shown said movable pillars as being of channel form, corresponding to the channel form of the fixed pillars, and having channels thereof presented outwardly and having the side flanges thereof engaging with the full length of the side flanges of its coöperating channel pillar. I provide means for moving the movable pillars toward and from the common center with reference to which the stationary pillars are fixed. Many specifically different constructions and arrangements of moving means may be employed for accomplishing this result. It is important that the movement of all the movable pillars, in or out be effected simultaneously. In the particular form shown, to which, however, my invention is not to be limited or restricted, I employ cylinders F, mounted upon the fixed pillars, each having a piston A', operating therein the rod or stem B', of which extends at one end through the fixed pillar A, and is secured to the movable pillar E. At its other end the rod B', extends through the cylinder head and carries a head or nut C', thereon, for a purpose presently to be more fully explained. The number of power cylinders to be mounted upon each fixed pillar A, for operating its coöperating movable pillar E, may be varied according to the exigencies or requirements, and, therefore, while I have shown three such power cylinders on each fixed pillar, the rod of the piston of each cylinder being connected, as described to the associated movable pillar, my invention as defined in the claims is not to be limited or restricted in this respect. Power medium such as water, steam, compressed air or the like is admitted simultaneously to one side or the other of all the power cylinders in order to effect the simultaneous movement in or out, of the movable pillars. To accomplish this result I have indicated a system of pipe connections D', adapted to be controlled by hand valves E', in any suitable or convenient manner or arrangement. It is obvious that other forms or constructions of power mechanism may be employed for moving the pillars E, without departure from the spirit and scope of my invention as defined in the claims.

Carried by each movable pillar E, is a core box section G, each suitably shaped upon its inner surface to form a closed cylindrical chamber when said sections are moved to the limit of their closing movement. The number of these core box sections, as in the case of the corresponding fixed and movable pillars may vary according to the exigencies and requirements, and the size of the core to be made, and therefore, while I have shown four sections G, my invention as defined in the claims is not to be limited or restricted in this respect. In practice I prefer to employ hollow core box sections that is, the sections are formed with chambers as indicated at H, thereby enabling said sections to be heated by supplying a heating medium, as steam, hot air or the like, to the chambers H, which thus constitute and form a heating jacket for the core box sections. It is through the contraction of the core box by the inward movement of the sections G, that the exterior compression is applied to the core, as will more fully appear hereinafter. The edges $A^2$, of the core box section are formed with knife edges whereby any projecting portions of core material may be cut off when the final compressing movement of the sections is effected.

Many specifically different constructions and arrangements may be employed for regulating and measuring the supply of core material to form a core, and for shaping the same and applying thereto the interior pressure. While therefore, I have shown and will now describe one construction and arrangement which I have found simple and efficient for the purpose, my invention as defined in the claims is not to be limited or restricted thereto. In the particular form shown I provide a core bar T, and arrange to move the same longitudinally through the core box in the operation of forming the core. This core bar may be supported and operated in many specifically different ways. In the particular form shown, to which my invention in its broad scope as defined in the claims is not to be limited or restricted, said bar is in the form of a hollow sleeve, adapted to be telescoped over the reduced end L, of a plunger M, the latter being arranged in a cylinder D, supported within a well or casing C, the core bar resting upon a shoulder R, formed by the reduced end L, of such plunger. The plunger carrying the core bar is designed to move in a true line with the geometrical center of the core box, the cylinder D, forming a guide for the plunger insures this result. The advancing end of the core bar is formed or provided with a tapering rammer head N, the object and function of which is to exert an outward pressure upon the material forming the core from the interior thereof, when said rammer head is advanced through the core box, and to compress such material outwardly. The plunger and core bar are arranged to move longitudinally through a loose ring O, arranged within an auxiliary casing P, surrounding the line of movement of said plunger and bar. The purpose and function of this ring is to compress and shape that portion of the core material forming the socket end of the core and to regulate the amount of such material, said ring being engaged by the shoulder R, on the plunger when the latter is approaching the limit of its advancing movement, and thereafter is advanced along with the plunger from the position shown in Fig. 1, to the position shown in Fig. 2. The set screws V serve to adjust the position of the ring O within its casing P, thereby regulating the amount of material required to form the socket end of the core.

A displacing or measuring tool S, is arranged to be received and centered upon the advancing end of the core bar, forming the rammer head N, thereof. The purpose and function of this displacing or measuring tool is to regulate the amount of core material necessary to be supplied to the core box to form a core, and to preliminarily support the column of such material when so supplied. In the form shown this measuring or displacing tool, comprises a hollow tubular body, and when inserted into the core box to be received and centered on the upper end of the rammer head, it coöperates with the inner wall of the core box to provide a space to receive the core material. The size of the tubular body of the tool determines the size of this space and hence, also, the amount of core material to be supplied, while at the same time, the column of core material is supported by the measuring or displacing tool as the plunger advances into the core box to effect the compression of the core material. The advancing movement of the plunger causes the tool S to be pushed ahead of it, and consequently the tool continues to form a support for the column of core material or that portion thereof in advance of the rammer head, until the tool is pushed entirely out of the core box.

The plunger M, may be operated by admitting a suitable power medium to the cylinder D.

The operation of the machine so far described is as follows:—When it is desired to form a core the plunger is moved into its initial or retracted position and the core bar is telescoped or sleeved thereover, and the ramming head placed on the end of the bar, if not formed thereon, and the displacing or measuring tool S is then placed and centered upon the ramming head. The core box sections are now moved toward each other to form a partially closed box, the space bounded by the interior surface of the core box sections, the exterior surface of the ramming head, the socket ring and the auxiliary casing constituting a chamber of the desired size and diameter, depending upon the relative arrangement and size of these parts, to hold the material necessary to produce a core of the desired size. This space or chamber is then filled with core forming material, and while my invention as defined in the claims is not to be limited thereto, I prefer to employ molding sand for this purpose, the measuring tool supporting the column of sand within the core box. The plunger carrying the core bar is now advanced through the core box, the advancing rammer end or head effecting an interior ramming or compression of the sand and the measuring tool being pushed out of the core box as the core bar advances. In order to afford a resistance against which the advancing tapered rammer head works, the plate K is cottered or otherwise secured over the end of the closed core box. This plate also serves to center and guide the measuring tool and core box. As the plunger approaches the limit of its advancing movement, the shoulder R, thereon engages the socket ring O, and advances the same to effect a compression and shaping of the sand forming the socket end of the core. When the core bar has been fully advanced into and completely fills the core box, it is desirable to give a final exteriorly applied compression to the core. This result may be accomplished in many specifically different ways. While, therefore, I have shown and will now describe various constructions and arrangements for accomplishing the desired object, it is to be understood that my invention as defined in the claims is not to be limited or restricted thereto. In one form shown I provide a strip J, having openings therethrough through which the outer ends of the piston rod B', extend, the nuts or heads C', being outside of said plate or strip J, as clearly shown. The openings J', in this strip or plate J, are at one part, large enough to permit the nuts or heads C', to pass through, but at another part said openings are not large enough to permit the nuts or heads to pass through and hence by suitably shifting the strips or plates J, in one direction the thickness of such strips or plates will be interposed between the cylinder heads and the nuts or heads C', on the piston rods, thereby preventing a full and complete movement of the core box sections to closed position. When, however, the strips or plates J, are shifted or moved in the other direction to bring the full openings J', into register with the nuts or heads C', then the impediment is removed and the power cylinder pistons are permitted to complete their full stroke. In the operation of the machine it is desirable to shift all the plates or strips J, simultaneously. This may be effected in many specifically different ways. I have shown a simple arrangement, to which, however, my invention as defined in the claims is not to be limited or restricted, wherein each strip or plate is connected to the stem of a piston operating in a small power cylinder M', mounted upon a suitable supporting bracket N'. Power medium is supplied simultaneously to all the power cylinders M', in any suitable or convenient manner thereby simultaneously shifting all the plates or strips. After the strips or plates J, are shifted to remove them as stops for the power cylinder pistons B', the core box sections are given their final closing movement thereby imparting the final exterior compression to the core and insuring absolute density of the core material throughout the formed core and positive adhesion of the core material to the core bar. The core is now finished, the core box is opened, the measuring tool and ramming head are removed and the plunger withdrawn to its initial position. The finished and formed cores may be removed in any suitable or desired manner. In the particular arrangement shown, a hoisting connection L', is suitably secured to the end of the core bar whereby the core bar carrying the core, may be lifted out of the opened box. Of course it is evident that the core bar and core might be removed sidewise through the opening between adjacent core box sections if such opening is sufficiently large. In case the core bar and core are lifted longitudinally out of the core box, it is desirable to protect the finished core from injury by striking or rubbing against the edges of the core box sections. This result may be accomplished in many different ways. In the particular form shown, to which, however, my invention as defined in the claims is not to be limited or restricted, I slip a block K', see Fig. 3, over the end of the core bar, and secure such block thereon by means of a cotter pin S', or otherwise, thereby forming a support for the end of the core. This block K', is of larger diameter than that of the core and hence prevents the core from striking against the edges of the core box section while the core is being removed.

In Fig. 8 I have shown another construction of machine embodying the broad principles of my invention as defined in the claims, and wherein the casing C, the cylinder D, plunger M, core bar T, rammer head N, and measuring tool S, all remain substantially the same in construction, function and mode of operation as the corresponding parts above described. In this form of my invention the core box sections $A^3$, are movable longitudinally upon stationary pillows $B^3$, mounted upon the casing C. The outer surfaces of the core box sections and the inner surfaces of the pillows which are in contact with each other, are inclined relative to the geometrical axis of the core to be formed, while the inner surfaces of the core box sections which form the box to receive and form the core material are truly cylindrical throughout and concentric with the geometric axis of the core. By reason of this construction and arrangement it will be seen that the desired final and external pressure is applied to the core by merely shifting the core box sections $A^3$, longitudinally. In this manner I avoid the necessity for employing independent power cylinders to contract the core box. The longitudinal movement of the core box sections to effect the exterior application of pressure may be effected in any suitable or convenient manner. An exceedingly simple arrangement is shown wherein said core box sections are arranged to move longitudinally within an auxiliary casing $R^3$, said flanged ring $P^3$, being telescoped over a sleeve $O^3$, and resting upon an exterior flange of said sleeve formed at the lower end thereof. The ring $P^3$, sleeve $O^3$, and auxiliary casing $R^3$, are arranged concentric with the line of movement of the core bar T, said bar moving therethrough when advanced to or retracted from its work. As the plunger M, advances to its work, and as it approaches the limit of its advancing movement, the shoulder R, thereon which forms a support for the core bar T, engages the lower end of sleeve $O^3$, and thereafter said sleeve is raised by the further advancing movement of the plunger. As the sleeve $O^3$, is raised the flange thereon engages the lower end of the ring $P^3$, and raises said ring thereby also raising or moving longitudinally the core box section $A^3$, and hence causing the same to laterally approach each other or to contract the area of the core box by reason of the inclined surfaces of the pillows $B^3$, against which said sections slide, thereby giving a final exteriorly applied pressure to the core and completing the same. The sleeve $O^3$, may also serve to shape and compress the material at the end of the core, and by suitably regulating the length of movement of this sleeve the degree of exteriorly applied pressure may be regulated. From this description it will be seen that in this form of my invention I have produced an exceedingly simple and efficient machine, and avoid the more or less complicated mechanism employed in connection with the operation of the core box sections of the construction shown in Figs. 1 to 7. After the core has been completed the core box is again expanded to permit the removal of the core by simply withdrawing or returning the plunger and core bar to their initial retracted positions thereby withdrawing the supports for the core box sections and enabling them to drop by gravity or to be moved back to their initial positions thereby opening or expanding the core box.

It will be observed that the core box sections A³ are hollow, as indicated at H³, thereby forming a jacket and enabling such sections to be heated by supplying a heating medium to the interior of such sections.

The operation of the machine will be fully understood from the foregoing description taken in connection with the accompanying drawings.

Many variations and changes in the details of construction and arrangement might readily suggest themselves to persons skilled in the art and still fall within the spirit and scope of my invention as defined in the claims. I do not desire therefore, to be limited or restricted to the exact details shown and described. But Having now set forth the object and nature of my invention and a construction embodying the principles thereof, what I claim as new and useful and of my own invention and desire to secure by Letters Patent is:—

1. In a machine for making molding cores, a core box adapted to receive the core material, means arranged within the box for applying an interior pressure outwardly to the core material, and means for contracting the core box to apply an exterior pressure inwardly to the core material.

2. In a machine for making molding cores, a sectional core box adapted to receive the core material, means arranged within the box for applying an interior pressure outwardly to the core material, and means for moving the sections of the core box inwardly to contract such box, and to apply an exterior pressure inwardly to the core material.

3. In a machine for making molding cores, a sectional core box, means operating within the box to compress the core material outwardly, and power mechanism for simultaneously moving the sections of such box to contract the same.

4. In a machine for making molding cores, a core box adapted to receive the core material, means for compressing said material outwardly from the interior of the core, and means for applying an exterior pressure inwardly to such material.

5. In a machine for making molding cores, a core box adapted to receive the core material, and means operating inside the box for forming the core within such box, in combination with means for heating such box.

6. In a machine for making molding cores, a core box having a jacket, adapted to receive a heating medium, and means operating inside the box for forming a core within said box.

7. In a machine for making molding cores, a core box composed of hollow sections and means for moving said hollow sections toward and from a common center to expand or contract such box.

8. In a machine for making molding cores, a sectional core box, pistons connected to the sections of said box and cylinders in which said pistons work in combination with means operating within the box to compress the core material outwardly, and means for simultaneously supplying operating medium to all of said cylinders.

9. In a machine for making molding cores, a contractible core box, means for maintaining said box in condition to receive the core material, means operating within said box to apply an internal compression to the core material, and means for contracting the box after the core material has been introduced thereto to apply an exterior compression to such material.

10. In a machine for making molding cores, a core box, means for supporting a column of core material in said box, and means for applying pressure to such material in said box, and means for applying pressure to such material both interiorly and exteriorly.

11. In a machine for making molding cores, fixed pillars and movable core box section coöperating therewith, and mechanism to move the core box sections, and core box sections carried by the movable pillars.

12. In a machine for making molding cores, fixed pillars having a channel form, coöperating channel pillars mounted to slide upon the fixed pillars, core box sections carried by the movable pillars and power mechanism connected to the movable pillars to move the same to open and close the core box.

13. In a machine for making molding cores, fixed pillars, movable pillars having full length bearing upon said fixed pillars, core box sections carried upon said movable pillars and power mechanism connected to said movable pillars to move the same.

14. In a machine for making molding cores, fixed channel pillars, juxtaposed movable channel pillars having the sides thereof arranged to engage and slide upon the sides of the fixed pillars, core box sections carried by the movable pillars, and power mechanism connected to the movable pillars to move the same.

15. In a machine for making molding cores, a sectional core box, means operating within the box to apply an interior compression to the core material outwardly, and means for moving the sections of said box toward and from a common center to contract or expand the box, the edges of said sections being formed with knife edges.

16. In a machine for making molding cores, a sectional core box, means for moving the sections of said box toward and from a common center to contract and expand the box, stops for limiting the movement of said sections toward each other, and means for withdrawing said stops to permit a completion of such movements.

17. In a machine for making molding cores, a sectional core box, power cylinders having their pistons connected to the core box sections, movable stops for limiting the movements of said pistons, and means for shifting said stops to permit complete movements of said pistons.

18. In a machine for making molding cores, fixed pillars, power cylinders carried thereby, and having pistons and rods, core box sections connected to said rods, stop plates having openings through which said rods extend, and means for shifting said plates to move the openings therein into and out of register with said rods.

19. In a machine for making molding cores, a contractible core box adapted to receive the core material, means adapted to be moved through said core box to exert an interior pressure outwardly upon the core material and means for contracting the core box to exert an exterior pressure inwardly upon such material.

20. In a machine for making molding cores, a core box adapted to receive the core material, means arranged within said box for regulating and measuring the amount of material required to form a core, a core bar, means for moving said bar through the box to compress the core material outwardly, and means for contracting the box to compress the core material on the bar.

21. In a machine for making molding cores, a core box adapted to receive the core material, a core bar means for moving the same through the box to exert an outward pressure on the core material, means for contracting the box to exert an inward pressure on said material, and means for opening the box to permit the removal of the bar and core.

22. In a machine for making molding cores, a core box adapted to receive the core material, a core bar, means for moving said bar into the box, means for thereafter contracting the box to compress the material on the bar, and means to permit the box to expand for the removal of the finished core and bar.

23. In a machine for making molding cores, a core box adapted to receive the core material, a core bar, means for moving the same through the box, a rammer head carried by the bar, and means for contracting the box.

24. In a machine for making molding cores, a core box, a core bar, a measuring tool, means for moving the bar and tool through the box, and means for contracting the box.

25. In a machine for making molding cores, a core box, a core bar, and a measuring tool, means for centering the tool upon the end of the bar, and means for contracting the box.

26. In a machine for making molding cores, a core box, a core bar, a plunger upon which said bar is mounted and by which said bar is moved endwise through the box, and means for contracting said box.

27. In a machine for making molding cores, a core box, a plunger, a core bar sleeved over said plunger, whereby when said plunger is moved said bar is moved through the box, and means for contracting said box.

28. In a machine for making molding cores, a core box, a core bar and means for moving the same through the box, in combination with a plate secured over the end of the core box to resist the pressure of the advancing movement of the bar and means for contracting the box.

29. In a machine for making molding cores, a core box, a core bar, means for moving the same through the box, means for contracting and expanding the box, and means for preventing the core from striking the box while being removed therefrom.

30. In a machine for making molding cores, a core box, a core bar, means for moving the same through the box, and means for contracting and expanding the box, in combination with a block mounted upon the core, said block being of greater diameter than the exterior diameter of the core.

31. In a machine for making molding cores, a core box, a core bar, means for moving the same through the box, a socket ring through which the core bar is moved, said ring adapted to shape the socket end of the core, and means for contracting said box.

32. In a machine for making molding cores, a core box, a casing, a socket ring adjustably mounted therein, a plunger, means for operating the same, said plunger arranged to engage said ring and advance the same to its work, and means for contracting said box.

33. In a machine for making molding cores, a core box, a socket ring, a plunger, a core bar carried thereby, and means for contracting the box.

34. In a machine for making molding cores, a core bar, a socket ring, a plunger, a core bar carried thereby, a measuring tool carried by the core bar, and means for contracting the box.

35. In a machine for making molding cores, a core box, a core bar, means for moving the same through the box, a tapering rammer head mounted on the end of the bar, and means for contracting the box.

36. In a machine for making molding cores, a core box, a shouldered plunger, a core bar, sleeved over said plunger and resting on the shoulder thereon, a socket ring through which the core bar and plunger operate, and means for contracting said box.

37. In a machine for making molding cores, a core box, a casing, a socket ring adjustably mounted therein, a plunger and means for operating the same, said plunger arranged to engage said ring and advance the same to its work and means for contracting the box.

In testimony whereof I have hereunto set my hand in the presence of the subscribing witnesses, on this 21st day of October A. D. 1908.

FRED HERBERT.

Witnesses:
H. NIXON,
F. HERBERT, Jr.